(12) United States Patent
Laksin et al.

(10) Patent No.: US 8,460,762 B2
(45) Date of Patent: Jun. 11, 2013

(54) ELECTRON BEAM CURABLE COMPOSITION FOR CURING IN A VACUUM CHAMBER

(75) Inventors: Mikhail Laksin, Boonton, NJ (US); Wolfgang Decker, Beaver Falls, PA (US); Subhankar Chatterjee, Hampton, NJ (US)

(73) Assignees: Ideon LLC, Hillsborough, NJ (US); Metallized Surface Technologies, LLC, Beaver Falls, PA (US)

( * ) Notice: Subject to any disclaimer, the term of this patent is extended or adjusted under 35 U.S.C. 154(b) by 613 days.

(21) Appl. No.: 12/639,955

(22) Filed: Dec. 16, 2009

(65) Prior Publication Data

US 2011/0143046 A1    Jun. 16, 2011

(51) Int. Cl.
*C08F 2/46* (2006.01)
*C08F 2/54* (2006.01)

(52) U.S. Cl.
USPC ............................ 427/496; 427/581; 427/596

(58) Field of Classification Search
None
See application file for complete search history.

(56) References Cited

U.S. PATENT DOCUMENTS

| | | | | |
|---|---|---|---|---|
| 3,547,683 A * | 12/1970 | Hayes et al. | | 427/497 |
| 4,303,696 A * | 12/1981 | Brack | | 427/503 |
| 4,586,111 A * | 4/1986 | Cichanowski | | 361/323 |
| 4,954,371 A * | 9/1990 | Yializis | | 427/497 |
| 5,260,095 A * | 11/1993 | Affinito | | 427/124 |
| 5,440,446 A * | 8/1995 | Shaw et al. | | 361/301.5 |
| 6,270,841 B1 | 8/2001 | Mikhael et al. | | 427/255.6 |
| 6,358,570 B1 * | 3/2002 | Affinito | | 427/495 |
| 6,447,553 B1 * | 9/2002 | Mikhael et al. | | 8/524 |
| 2006/0057398 A1 * | 3/2006 | Zimmermann et al. | | 428/426 |
| 2008/0233306 A1 | 9/2008 | Turgis et al. | | 427/511 |
| 2009/0272322 A1 * | 11/2009 | Fujinami et al. | | 118/723 R |

FOREIGN PATENT DOCUMENTS

| | | |
|---|---|---|
| JP | 2005-238625 | 9/2005 |
| JP | 2006-168238 | 6/2006 |
| JP | 2007-238702 | 9/2007 |

* cited by examiner

*Primary Examiner* — Katherine A Bareford
*Assistant Examiner* — Michael P Rodriguez
(74) *Attorney, Agent, or Firm* — Roberts & Roberts, LLP

(57) ABSTRACT

A liquid composition and a process for coating the composition onto a surface of a substrate in a substantially oxygen-free atmosphere, under vacuum conditions. The composition comprises one or more components, all of which components do not go into a gas or vapor phase under the vacuum conditions. The composition has an ethylenically unsaturated component composed of an ethylenically unsaturated methacrylate monomer, or a combination of an ethylenically unsaturated methacrylate monomer and an ethylenically unsaturated methacrylate oligomer. The ethylenically unsaturated component is polymerizable or crosslinkable by the application of sufficient electron beam radiation. The composition is substantially absent of ethylenically unsaturated acrylate components, substantially absent of polymerization initiators, and substantially absent of solvents. The composition optionally further comprises one or more polymers without an acrylate functional group and without a methacrylate functional group. The composition optionally further comprises one or more of waxes, pigments, and/or wetting agents.

23 Claims, No Drawings

ELECTRON BEAM CURABLE COMPOSITION FOR CURING IN A VACUUM CHAMBER

BACKGROUND OF THE INVENTION

1. Field of the Invention

The present invention relates to a composition and a process for producing thin, solid, polymeric films, by liquid deposition on a substrate with subsequent electron beam curing. Both the liquid deposition and curing are done in a substantially oxygen-free atmosphere under vacuum conditions. The composition comprises one or more components, all of which components do not go into a gas phase under the vacuum conditions. The composition has an ethylenically unsaturated component composed of an ethylenically unsaturated methacrylate monomer, or a combination of an ethylenically unsaturated methacrylate monomer and an ethylenically unsaturated methacrylate oligomer. The ethylenically unsaturated component is polymerizable or crosslinkable by the application of sufficient electron beam radiation. The composition is substantially absent of ethylenically unsaturated acrylate components, polymerization initiators, and solvents.

2. Description of the Related Art

There is great commercial interest in applying protective and/or functional coatings over metalized film substrates directly inside of a vacuum chamber and curing them via electron beam irradiation. A benefit of electron beam curable compositions is that they are essentially completely solid and do not transfer into the gas or vapor phase under the vacuum. Applying solid curable coatings under vacuum is beneficial for coating uniformity and adhesion to non-oxidized metal surfaces. This is beneficial in comparison to applying electron beam curable coatings in air over oxidized metal surfaces.

Thin metallic and polymeric films add or promote desirable properties for particular applications. For example, foils used to preserve food need to have very low permeability to oxygen; the exterior surface of packaging material has to be capable of accepting printing inks; and packaging materials for electronic products also require a limited amount of conductivity to dissipate electrostatic charges. It is desirable and sometimes necessary to modify the physical properties of polymeric films to improve their suitability for the intended purpose. Preferably, the films are directly formed with a composition and molecular structure characterized by the desired properties. Thin films of metals and polymers are formed by deposition onto appropriate substrates by a variety of known processes, most notably through film formation by wet chemistry or vapor deposition. Chemical processes produce soluble thermoplastic as well as insoluble thermoset polymers and involve the use of solvents; thus, film formation is achieved through solvent diffusion and evaporation. As a result, these processes require relatively long residence times and the undesirable step of handling solvents.

Vapor deposition processes involve the evaporation of a liquid monomer in a vacuum chamber, its deposition onto a cold substrate, and subsequent polymerization by exposure to electron beam or ultraviolet radiation. U.S. Pat. Nos. 6,270,841 and 6,447,553 illustrate a liquid monomer from a supply reservoir which is atomized in a heated evaporator section of a vacuum deposition chamber where it flash vaporizes under vacuum. The resulting monomer vapor passes into a condensation section of the unit where it is vapor applied onto a substrate, condenses and forms a thin liquid film upon contact with the cold surface of the substrate. The liquid deposited film is then cured by exposure to an electron beam or ultraviolet radiation source. A problem with such a technique is that the vaporized composition coats much of the inside of the equipment inside the vacuum chamber, and then cures into an unwanted solid on the equipment when irradiated. Such unwanted solids are difficult to remove. In addition, these patents teach compositions which contain multifunctional acrylates which polymerize to solids almost instantaneously in an oxygen free atmosphere.

Traditionally, electron beam curable coatings are mixtures of acrylate functional pre-polymers, oligomers and monomers that can undergo free-radical polymerization under exposure to electron beam irradiation. Typically, electron beam free radical polymerization is inhibited by the presence of oxygen and therefore electron beam coatings must cure under a nitrogen blanket. The complete curing requires a substantial electron beam dose.

It is also known that methacrylate functional pre-polymers, oligomers and monomers can undergo free radical polymerization but at much slower rate than polymerization of acrylates, and they cannot be used in any known commercial application of electron beam curing technology. Most of acrylate functional compounds can quickly polymerize in oxygen free atmosphere, especially under high temperature conditions even without exposure to electron beam irradiation.

It was surprisingly found that methacrylate based compositions can actually retain their fluidity under the vacuum and elevated temperature conditions, avoiding premature polymerization. Even small quantity additions of acrylate functional groups quickly lead to loss of stability. According to the invention, a composition is formed which has an ethylenically unsaturated component composed of an ethylenically unsaturated methacrylate monomer, or a combination of an ethylenically unsaturated methacrylate monomer and an ethylenically unsaturated methacrylate oligomer. The ethylenically unsaturated component is polymerizable or crosslinkable by the application of a low dose of electron beam radiation. The composition is substantially absent of ethylenically unsaturated acrylate components, polymerization initiators, and solvents. The resulting cured composition on the substrate gives much improved moisture barrier, oxygen barrier scratch resistance, adhesion and printability properties. The process affords a complete curing, with a low voltage electron beam cure, and without oxygen which would oxidize metalized surfaces leading to brittleness and difficulty in printing.

SUMMARY OF THE INVENTION

The invention provides a process for coating a substrate which comprises a) coating a liquid composition onto a surface of a substrate in a substantially oxygen-free atmosphere, under vacuum conditions, which composition comprises one or more components, all of which components do not go into a gas or vapor phase under said vacuum conditions, said composition comprising an ethylenically unsaturated component, said ethylenically unsaturated component consisting essentially of an ethylenically unsaturated methacrylate monomer, or a combination of an ethylenically unsaturated methacrylate monomer and an ethylenically unsaturated methacrylate oligomer, which ethylenically unsaturated component is polymerizable or crosslinkable by the application of sufficient electron beam radiation, said composition being substantially absent of ethylenically unsaturated acrylate components, substantially absent of polymerization initiators, and substantially absent of solvents;

b) exposing said liquid composition to sufficient electron beam radiation, in a substantially oxygen-free atmosphere, under vacuum conditions, to polymerize or crosslink the composition.

The invention also provides a liquid composition suitable for coating onto a surface of a substrate in a substantially oxygen-free atmosphere, under vacuum conditions, which composition comprises one or more components, all of which components do not go into a gas or vapor phase under said vacuum conditions, said composition comprising an ethylenically unsaturated component, said ethylenically unsaturated component consisting essentially a combination of an ethylenically unsaturated methacrylate monomer and an ethylenically unsaturated methacrylate oligomer, which ethylenically unsaturated component is polymerizable or crosslinkable by the application of sufficient electron beam radiation, said composition being substantially absent of ethylenically unsaturated acrylate components, substantially absent of polymerization initiators, and substantially absent of solvents; wherein the composition optionally further comprises one or more polymers without an acrylate functional group and without a methacrylate functional group; and wherein the composition optionally further comprises one or more of waxes, pigments, and/or wetting agents.

DESCRIPTION OF THE INVENTION

The invention is conducted by first forming a liquid composition which comprises one or more components, all of which components do not go into a gas or vapor phase under said vacuum conditions. The composition first comprises an ethylenically unsaturated component. The ethylenically unsaturated component may be an ethylenically unsaturated methacrylate monomer, or a combination of an ethylenically unsaturated methacrylate monomer and an ethylenically unsaturated methacrylate oligomer. The ethylenically unsaturated component is polymerizable or crosslinkable by the application of sufficient electron beam radiation. It is important that the composition be substantially absent of ethylenically unsaturated acrylate components, polymerization initiators, and solvents.

Suitable ethylenically unsaturated methacrylate monomers non-exclusively include methacrylates of primary or polyhydric alcohols such as methyl methacrylate, ethyl methacrylate, propyl methacrylate, butyl methacrylate, hydroxyethyl methacrylate, 2-ethylhexyl methacrylate, diethylene glycol dimethacrylate, trimethylolpropane trimethacrylate, ethylene glycol dimethacrylate, diethylene glycol dimethacrylate, triethylene glycol dimethacrylate, tetraethylene glycol dimethacrylate, polyethylene glycol dimethacrylates, trimethylolpropane ethoxylate trimethacrylate, trimethylolpropane polyethoxylate trimethacrylates, pentaerythritol dimethacrylate, pentaerythritol trimethacrylate, dipentaerythritol dimethacrylate, dipentaerythritol tetramethacrylate, tripentaerythritol octamethylacrylate, 1,3-butanediol dimethacrylate, bismethacrylates of polyethylene glycols, and the like. Other suitable methacrylic monomers include both monofunctional and polyfunctional compounds. Such monomers will generally be reaction products of methacrylic acid with one or more mono- or poly-basic, substituted or unsubstituted, alkyl ($C_1$ to $C_{18}$), aryl or aralkyl alcohols. Methacrylates in which the alcohol moiety contains a polar substituent (e.g., an hydroxyl, amine, halogen, cyano, heterocyclic or cyclohexyl group) are useful. Specific methacrylate monomers include hydroxyethylmethacrylate, isobornyl methacrylate, tetrahydrofurfuryl methacrylate, diethylene-glycoldimethacrylate, 1,4-butanedioldimethacrylate, butylene stearyl methacrylate, glycoldimethacrylate, neopentyl glycol dimethacrylate, octylmethacrylate and decylmethacrylate, polyethyleneglycol dimethacrylate, trimethylcyclohexyl methacrylate, benzyl methacrylate, butyleneglycoldimethacrylate, polybutyleneglycol dimethacrylate, tripropyleneglycol dimethacrylate, trimethylolpropane trimethacrylate, ditrimethylolpropane tetramethacrylate, pentaerythritol tetramethacrylate, and dipentaerythritol pentamethacrylate, and the like.

In one embodiment, the ethylenically unsaturated methacrylate monomer may be present in an amount of from about 5 wt. % to about 100 wt. % based on the weight of the overall composition. In another embodiment, the ethylenically unsaturated methacrylate monomer may be present in an amount of from about 20 wt. % to about 80 wt. % based on the weight of the overall composition. In yet another embodiment, the ethylenically unsaturated methacrylate monomer may be present in an amount of from about 50 wt. % to about 70 wt. % based on the weight of the overall composition.

In another embodiment of the invention, the composition may also contain an ethylenically unsaturated methacrylate oligomer. As used herein, the term oligomer is intended to refer not only to molecular chains normally designated as such in the art, typically containing from two to ten methacrylate monomer units, but also to low-molecular weight polymers. For the purpose of this invention, the term oligomer also encompass any polymerized molecule having a molecular weight sufficiently low to permit the overall composition to remain in the liquid state under vacuum at a temperature lower than its temperature of thermal decomposition. A maximum molecular weight is approximately 5,000. The molecular weight depends on the specific monomer used, but it is understood that greater molecular weights are included in the practice of the invention so long as the overall composition remains a liquid under the vacuum conditions. Therefore, the invention is not to be limited to polymeric chains with molecular weight less than about 5,000, but is intended to include any polymeric molecule, herein defined as oligomeric, such that the composition remains a liquid at the temperature and pressure of its intended use and a temperature lower than the temperature at which it decomposes or otherwise degrades. Useful ethylenically unsaturated methacrylate oligomers non-exclusively include compounds having repeating units of the above monomers, and suitable molecular weights such that the overall composition remains a liquid under the vacuum and temperature conditions of this invention.

Suitable ethylenically unsaturated methacrylate oligomers non-exclusively include methacrylated epoxies, methacrylated polyurethanes, methacrylated polyesters, polyether methacrylates, polyester methacrylates, and ethoxylated or propoxylated di- or multi-functional methacrylates.

When the ethylenically unsaturated methacrylate oligomer is employed, it may be present in an amount of from more than 0 wt. % to about 95 wt. % based on the weight of the overall composition. In another embodiment, the ethylenically unsaturated methacrylate oligomer may be present in an amount of from about 5 wt. % to about 80 wt. % based on the weight of the overall composition. In yet another embodiment, the ethylenically unsaturated methacrylate oligomer may be present in an amount of from about 15 wt. % to about 30 wt. % based on the weight of the overall composition.

In another embodiment, the composition further comprises one or more inert polymers, i.e. non-reactive under the process conditions, without an acrylate functional group and without a methacrylate functional group. Useful polymers non-exclusively include rosin esters, rosin ester derivatives, acrylic polymers, urethane polymers, epoxy polymers and ketone polymers, and the like. The choice and amount of polymer may be selected by the skilled artisan to give the desired viscosity to the overall composition.

When the inert polymer is employed, it may be present in an amount of from more than 0 wt. % to about 30 wt. % based on the weight of the overall composition. In another embodiment, the inert polymer may be present in an amount of from about 5 wt. % to about 15 wt. % based on the weight of the overall composition. In yet another embodiment, the inert polymer may be present in an amount of from about 8 wt. % to about 12 wt. % based on the weight of the overall composition.

The composition may further comprise one or more of waxes, pigments, and/or wetting agents.

Suitable waxes non-exclusively include polyethylene waxes, polyamide waxes, Teflon waxes, Carnauba waxes, or combinations thereof, which when present are in amounts of from about 0.1 wt. % to about 3 wt. %, preferably from about 0.25 wt. % to about 0.5 wt. % based on the weight of the overall composition.

Suitable wetting agents non-exclusively include polysiloxanes, polyacrylics, linear and branched polyalkoxyalate compounds, or combinations thereof, which when present are in amounts of from about 0.25 wt. % to about 2 wt. %, preferably from about 0.5 wt. % to about 1 wt. % based on the weight of the overall composition.

Suitable pigments non-exclusively include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP111-S (Paul Uhlich); Brilliant Green Toner GR 0991 (Paul Uhlich); Lithol Scarlet D3700 (BASF); Solvent Red 49; Pigment red 57:1; Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Solvent Blue 808; Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA or Irgalite Blue NGA (Ciba-Geigy); Paliogen Blue 6470 (BASF); Sudan II (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Solvent Yellow 162; Paliogen Yellow 152, 1560 (BASF); Lithol Fast Yellow 0991 K (BASF); Paliotol Yellow 1840 (BASF); Novopern Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hansa bril yellow SGX 03(B); Hostaperm Pink E; Fanal Pink D4830 (BASF); Cinquasia Magenta (Du Pont); Paliogen Black L0084 (BASF); Pigment Black K801 (BASF); and carbon blacks such as REGAL 330..® .. (Cabot), Carbon Black 5250, Carbon Black 5750 (Columbia Chemical), and the like. Examples of suitable dyes also include Pontomine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Uquid Special 110, available from Sandoz, Inc.; D&C Yellow #10 (Acid Yellow 3), available from Tricon; Yellow Shade 16948, available from Tricon; Basocid Black.times.34, available from BASF; Carta Black 2GT, available from Sandoz, Inc.; Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrozol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) or combinations thereof. For this invention the term pigment includes a conductive powder such as a metal powder of iron, silver, copper aluminum or their alloys, a metal oxide powder, a metal carbide powder, a metal boride powder, carbon black, graphite or combinations thereof.

When a pigment is employed it may be present in the composition in an amount of from above 0 wt. % to about 30 wt. %. In another embodiment, the pigment may be present in an amount of from about 2 wt. % to about 15 wt. % based on the weight of the overall composition. In yet another embodiment, the pigment may be present in an amount of from about 5 wt. % to about 10 wt. % based on the weight of the overall composition.

Other optional components of the overall composition non-exclusively include adhesion promoters, flow control agents, hardness control agents, deaerators, polymerization inhibitors, dispersing agents, rheology modifiers, surfactants, or combinations thereof, provided the overall composition remains a liquid under the temperature and vacuum conditions of the process described herein, and the overall composition is curable under the application of electron beam irradiation. The selection of these optional components and their quantity in the overall composition can easily be determined by the skilled artisan.

The overall composition is substantially absent of ethylenically unsaturated acrylate components, substantially absent of polymerization initiators, and substantially absent of solvents.

The composition is then applied to the surface a suitable substrate in a liquid, i.e. non-vapor form. Suitable substrates include cellulose derivatives such as cellulose nitrate, cellulose acetate, regenerated cellulose and cellulose ethers such as ethyl and methyl cellulose; polystyrene plastics such as polystyrene and polymers and copolymers of various ring substituted styrenes, for example o-, m- and p-methylstyrene and other ring-substituted styrenes as well as side-chain substituted styrenes such as alpha-, methyl- and ethylstyrene and various other polymerizable and copolymerizable vinylidenes; various vinyl polymers and copolymers such as polyvinyl butyral and other acetals, polyvinyl chloride, polyvinyl acetate and its hydrolysis products, polyvinyl chloride-acetate copolymers; acrylic resins such as polymers and copolymers of methyl acrylate, methyl methacrylate, acrylamide, methylolacrylamide and acrylonitrile; polyamide, polyphenylene sulfide, polyetheretherketone, polyetherketone, polyketone, polyetherimide, polysulfone, polyethersulfone, polyaryletherketone, polyurethane, polyethylene napthalate, polybutylene terephthalate), polyethylene terephthalate, polyamide, polycarbonate, COC, polyoxymethylene, acrylonitrile butadiene styrene, polyvinylchloride, polyphenylene, polyethylene, ethylene/tetrafluoroethylene, (polytetrafluoroethylene, polyesters and unsaturated-modified polyester resins such as those made by condensation of polycarboxylic acids with polyhydric phenols or modified using unsaturated carboxylic acid and further modified by reacting the alkyd with another monomer; polymers of allyl diglycol carbonate. Practical substrates comprise nitrocellulose, polyurethane, polyester, polyolefins, epoxy, acrylic, amide, vinyl, or combinations thereof. Preferred substrates include polyethylene terephthalate and polypropylene. In a preferred embodiment, the substrate is substantially transparent, in particular, substantially transparent to infrared radiation. The substrate has a thickness which is at least sufficient to maintain its integrity as a self-sustaining film. In one embodiment the substrate has a thickness of from about 5 μm to about 700 μm, preferably from about 12 μm to about 100 μm, and more preferably from about 10 μm to about 50 μm.

In a preferred embodiment the substrate has a metalized surface. Typically this metal surface may be applied to the substrate by vapor or vacuum deposition, sputtering, or coating of a metal dispersed in suitable composition. A vacuum metallization process involves placing a roll of the substrate material in a vacuum chamber which also contains a heated crucible containing a metal that is to be deposited. Under high vacuum, the heated metal vaporizes and deposits onto a moving cold web of the substrate material. The process is carried out at high speed inside a vacuum chamber. The film thickness can be adjusted from nanometer to micron thickness precisely and reproducibly. A large number of metals or even mixed metals can be deposited, offering a broad flexibility. Such metals may be any conducting metals, e.g., copper, silver, aluminum, gold, iron, nickel, tin, stainless steel, chromium, zinc, or alloys or combinations thereof. Vapor deposition techniques are well known in the art. Typically, a section of the substrate is introduced into a commercially available vapor coating machine and vapor coated to the desired thickness with the metal. One such machine is a DENTON Vacuum DV-515 bell jar vapor coating machine. The thickness of the deposited electrically conductive metal layer is at a minimum, that amount which forms a continuous layer on the substrate. Usually the layer is thin, i.e. up to about 10 μm, preferably up to about 3 μm. More usually, the thickness of the deposited electrically conductive metal layer ranges from about 5 to about 200 nanometers (nm), for example, from about 10 to 100 nm, e.g. from about 30 to about 80 nm.

The liquid composition may be applied to the surface of a web of the substrate material by any liquid transfer means known in the art such as, for example, by means of a roller coater, an anilox roller, a gravure coater, or a meniscus coater. The composition can be applied using printing techniques such as gravure, and flexography using a printing plate, a letterpress, flexographic plate or synthetic rubber compound based plate. The composition forms a layer having a thickness which is at a minimum, that amount which forms a continuous layer on the substrate, and usually up to about 1 μm. Usually a web of the substrate is coated with the liquid composition at speeds of up to about 10 meters per second.

The composition is then exposed to sufficient electron beam radiation to cure, polymerize or crosslink the composition to substantially solid form. The amount of energy absorbed, also known as the dose, is measured in units of MegaRads (MR or Mrad) or kiloGrays (kGy), where one Mrad is 10 kGy, one kGy being equal to 1,000 Joules per kilogram. The electron beam dose should be within the range of from about 1 kGy to about 40 kGy, preferably from about 10 kGy to about 30 kGy, and more preferably from about 15 kGy to about 20 kGy, for essentially complete curing. Electron beam radiation is preferably conducted at an electron beam voltage of from about 7 kV to about 15 kV. Moreover, curing is substantially instantaneous and provides a cure percentage at or near one hundred percent.

An important feature of the invention is that the liquid composition application and subsequent electron beam radiation application are sequentially conducted in a vacuum chamber in a substantially oxygen-free atmosphere, under vacuum conditions. In one embodiment, liquid composition application and electron beam irradiation are conducted at a vacuum of from about $10^{-1}$ bar to about $10^{-5}$ bar, and at a temperature of from about 0° C. to about 80° C. In one embodiment, liquid composition application and electron beam irradiation are conducted without braking the vacuum conditions.

The following non-limiting examples serve to illustrate the invention.

EXAMPLES

| | Supplier | Example 1 | Example 2 | Example 3 | Example 4 | Example 5 |
|---|---|---|---|---|---|---|
| IsoRad 190 MA Polyurethane methacrylate | SI Group | 19.9 | | 19.9 | | |
| Epoxy metacrylate resin | | | | | 14.9 | 14.9 |
| IsoRad 1850 MA novolac methacrylate resin | SI Group | | 24.9 | | | |
| TMPTMA SR350 metacrylate functional monomer | Sartomer | 80 | 75 | 65 | 85 | 55 |
| HDDMA 1,6 hexane diol methacrylate | Sartomer | | | 15 | | |
| SunFast 249-7084 15:3 blue pigment | Sun Chemical | | | | | 30 |
| N-PAL, inhibitor | IGM | 0.1 | 0.1 | 0.1 | 0.1 | 0.1 |
| Total | | 100 | 100 | 100 | 100 | 100 |

Examples 1-4 were prepared by blending components with high speed mixer. A small sample of each mixture was placed inside of the vacuum chamber for 30 min and checked for stability. All samples remained fluid after the test.

Larger samples of the compositions according to Example 1 and 2 were prepared for applying over a metalized aluminum layer inside of a vacuum chamber via an anilox based applicator and curing the with 5 kGy of electron beam irradiation. Both samples demonstrated good stability under vacuum, forming a uniform layer with good adhesion to aluminum surface.

Example 5 was prepared by first mixing individual components and then grinding them on a three roll mill. The Example 5 components were then mixed with the Example 1 components at a 30:70 ratio which then was transferred via anilox roller and cured inside of the vacuum chamber, demonstrating good stability and cure.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for coating a substrate which comprises
a) coating a liquid composition onto a surface of a substrate in a substantially oxygen-free atmosphere, under vacuum conditions in a vacuum chamber, which composition comprises one or more components, all of which components do not go into a gas or vapor phase under said vacuum conditions while in said vacuum chamber, said composition comprising an ethylenically unsaturated component, said ethylenically unsaturated component consisting essentially of an ethylenically unsaturated methacrylate monomer, or a combination of an ethylenically unsaturated methacrylate monomer and an ethylenically unsaturated methacrylate oligomer, which ethylenically unsaturated component is polymerizable or crosslinkable by the application of sufficient electron beam radiation, said composition being substantially absent of ethylenically unsaturated acrylate components, substantially absent of polymerization initiators, and substantially absent of solvents;
b) exposing said liquid composition to sufficient electron beam radiation, in a substantially oxygen-free atmosphere, under vacuum conditions, to polymerize or crosslink the composition.

2. The process of claim 1 wherein the composition further comprises one or more polymers without an acrylate functional group and without a methacrylate functional group.

3. The process of claim 1 wherein the composition further comprises one or more polymers without an acrylate functional group or methacrylate functional group selected from rosin esters, rosin ester derivatives, acrylic polymers, urethane polymers, epoxy polymers and ketone polymers.

4. The process of claim 1 wherein the composition further comprises one or more of waxes, pigments, and/or wetting agents.

5. The process of claim 1 wherein the ethylenically unsaturated component comprises from about 5 wt. % to about 100 wt. % of an ethylenically unsaturated methacrylate monomer.

6. The process of claim 1 wherein the ethylenically unsaturated component comprises from about 50 wt. % to about 70 wt. % of an ethylenically unsaturated methacrylate monomer.

7. The process of claim 1 wherein the ethylenically unsaturated component comprises from more than 0 wt. % to about 95 wt. % of an ethylenically unsaturated methacrylate oligomer.

8. The process of claim 1 wherein the ethylenically unsaturated component comprises from 15 wt. % to about 30 wt. % of an ethylenically unsaturated methacrylate oligomer.

9. The process of claim 1 wherein the composition further comprises from more than 0 wt. % to about 30 wt. % of one or more polymers without an acrylate or methacrylate functional group.

10. The process of claim 1 wherein the composition further comprises from 8 wt. % to about 12 wt. % of one or more polymers without an acrylate or methacrylate functional group.

11. The process of claim 1 wherein the composition further comprises one or more of waxes in an amount of from more than 0 wt. % to about 3 wt. %.

12. The process of claim 1 wherein the composition further comprises one or more of pigments in an amount of from more than 0 wt. % to about 30 wt. %.

13. The process of claim 1 wherein the composition further comprises one or more of pigments in an amount of from about 5 wt. % to about 10 wt. %.

14. The process of claim 1 wherein the composition comprises 100% of said ethylenically unsaturated component.

15. The process of claim 1 comprising coating the liquid composition onto the surface of the substrate by means of a roller coater.

16. The process of claim 1 comprising coating the liquid composition onto the surface of the substrate by means of a meniscus coater.

17. The process of claim 1 wherein the substrate comprises a polyester or a polyolefin.

18. The process of claim 1 wherein the surface of substrate comprises a metal.

19. The process of claim 1 wherein the surface of substrate comprises a metal comprising one or more of aluminum, copper, nickel, iron, silver, gold, tin, stainless steel, chromium, zinc or alloys or combinations thereof.

20. The process of claim 1 wherein the exposing of said liquid composition to sufficient electron beam radiation is conducted with an electron beam dose of from about 1 kGy to about 40 kGy.

21. The process of claim 1 wherein the exposing of said liquid composition to sufficient electron beam radiation is conducted with an electron beam voltage of from about 7 kV to about 15 kV.

22. The process of claim 1 wherein step a) and step b) are conducted at a vacuum of from about $10^{-1}$ bar to about $10^{-5}$ bar, and at a temperature of from about 0° C. to about 80° C.

23. The process of claim 1 wherein step a) is conducted and thereafter step b) is conducted, wherein step a) and step b) are conducted without breaking said vacuum conditions.

* * * * *